3,655,771
PROCESS FOR PRODUCING FORMALDEHYDE
Hachiro Tadenuma, Akita-shi, Torajiro Murakami, Tokyo, and Hirotsugu Mitsushima, Akita-shi, Japan, assignors to Sumitomo Chemical Company, Limited, Osaka, Japan
No Drawing. Continuation-in-part of application Ser. No. 379,030, June 29, 1964. This application Sept. 4, 1968, Ser. No. 776,293
Int. Cl. C07c 45/16
U.S. Cl. 260—603 HF    14 Claims

ABSTRACT OF THE DISCLOSURE

Formaldehyde is prepared by oxidizing dimethyl ether or a mixture of dimethyl ether and methanol with air in the presence of a tungsten oxide catalyst.

---

The present application is a continuation-in-part of application Ser. No. 379,030, filed in United States Patent Office on June 29, 1964 and now abandoned.

This invention relates to a process for producing formaldehyde by use of a catalyst consisting essentially of tungsten oxide. More particularly this invention relates to a process for producing formaldehyde from dimethyl ether and/or methanol by use of a catalyst consisting essentially of tungsten oxide with or without additives.

It is well known that usually from 2 to 4 percent by weight of dimethyl ether is produced as a by-product in the commercial production of synthetic methanol. However, at present, the recovery of this material for the purpose of practical use is scarcely being put into practice and it is now only being purged in the air as an off-gas from the distillation apparatus.

The reason for this seems to be due to the fact that since dimethyl ether itself is a relatively stable compound, it has been considered to be of little practical value as an industrial raw material as well as the fact that since the capacity of methanol production equipment heretofore has been small, the amount of by-product, dimethyl ether has been only small.

However, the commercial production scale of methanol at the present time has become so much expanded that the problem of utilizing the large amount of by-product dimethyl ether can no more be overlooked.

As methods for utilizing dimethyl ether commercially, there are known the methods disclosed in German Pat. No. 413,448, U.S. Pat. No. 2,246,569 and Japanese Pat. No. 157,399. However these patents relate to a method for producing formaldehyde by the oxidation of 1 part by volume of dimethyl ether, with from 0.5 to 5 parts by volume of air in the presence of a conventional catalyst for the production of Formalin from methanol, such as metallic copper, metallic silver or the like.

However, according to the experimental result traced by the inventors of this invention, the percentage of dimethyl ether reacted on the catalyst bed per fed dimethyl ether in the reaction conditions disclosed in the specifications of the above-mentioned patents was as low as in the order of from 15 to 20 percent. The selectivity of the catalyst expressed by the percentage of ether converted into formaldehyde per reacted ether in the above-mentioned case was from 30 to 50 percent. Even when unreacted dimethyl ether was recovered and circulated, the yield of formaldehyde product per raw material ether was estimated to be less than 30 percent in the commercial production.

It was also experienced by the present inventors that the complete recovery of dimethyl ether in the effluent gas from the reaction apparatus was extremely difficult. Moreover, for the purpose of recovery and recirculation of unreacted gas the apparatus and the equipment inevitably become very complicated and enormously large.

An object of the present invention is to provide an improved catalytic composition capable of producing formaldehyde from dimethyl ether or a mixture of dimethyl ether and methanol with a conversion at one passage much greater than any conventional method. Another object of the present invention is to provide an improved method for producing formaldehyde by use of the same catalyst.

According to the present invention, dimethyl ether or a mixture of dimethyl ether and methanol can be oxidized with air in the presence of a catalytic composition containing, as an essential ingredient, tungsten oxide with or without not more than 10% of an additive, such as oxides of B, Se, Mo, V, Bi, P or the like or a compound, such as $H_3PO_4$, $(NH_4)_2HPO_4$, $NH_4Cl$, or the like, with an astonishing yield of formaldehyde of 65 to 80 percent at one passage. Tungsten oxide is made by well-known methods by adding to ammonium tungstate concentrated hydrochloric or nitric acid, to precipitate the oxide, which may be, as such, molded into tablets or supported on inert carriers, such as alumina, Carborundum, pumice or the like. In this case, vanadium oxide, boron oxide, molybdenum oxide, phosphoric acid, an ammonium salt thereof, ammonium chloride or the like may be added to tungsten oxide in an amount of not more than 10%, in order to maintain the activity of tungsten oxide at the original level and to obtain a catalyst useful to industry having a sufficient mechanical strength to withstand uses in industry. The addition thereof results in the combination with tungsten oxide and consequently the aggregatability of powdered tungsten oxide is enhanced, the molding of the oxide is facilitated and the oxide is hardened.

For example, 5% by weight of phosphoric acid is added to tungsten oxide powder produced in the generally known manners, and the resulting mixture is milled well with water into a paste. This paste is dried, ground into 12 mesh, size-controlled and shaped into tablets by a tablet-forming machine. These tablets are sufficiently dried, and thereafter burned at 500° C. for 7 to 8 hours to obtain very hard tablets.

In the present method, dimethyl ether may be used alone or methanol and dimethyl ether can be used in admixture with each other to produce formaldehyde.

When dimethyl ether is used as a raw material, the reaction conditions usually fall in the following ranges all the percentages referred to hereinafter are percent by mol unless otherwise specified:

Dimethyl ether: 1–17.4%
 Air: 99–82.6%
 Reaction temperature: 350°–600° C.
 Space velocity: 1,000–20,000

Preferable conditions are as follows:

Dimethyl ether: 3–12%
 Reaction temperature: 400°–500° C.
 Space velocity: 1,000–10,000

The results obtained in these conditions are as follows: The conversion of dimethyl ether is from 70 to 100% in one passage of the fed gas over the catalyst, the formaldehyde selectivity is 80 to 90%, and the yield of formaldehyde amounts to 65 to 80%.

In accordance with the present method the yield of formaldehyde per one passage is about 10 times as much as in the conventional methods. There is no need of equipment for recirculating the unreacted material. Accordingly, this is a very advantageous method.

Similar results are also obtained from a starting mixture of dimethyl ether and methanol. In this case, the reaction conditions are as follows:

Dimethyl ether: 1–17.4%
Methanol: 29.6–1%
Air: 98–70%
Reaction temperature: 350°–600° C.
Space velocity: 1,000–20,000

Preferable conditions are as follows:

Dimethyl ether: 2–10%
Methanol: 20–4%
Reaction temperature: 400°–500° C.
Space velocity: 1,000–10,000

Said reactions may be effected in conditions outside said ranges, but these conditions are not valuable to industry.

EXAMPLE 1

40 g. of ammonium tungstate was dissolved in 1 l. of a 5 percent aqueous solution of ammonia maintained at a temperature of 90° C. If the ammonium tungstate was difficult to dissolve, it was decomposed in advance by boiling with a diluted acid or it was mixed with a small amount of methyl amine to promote the dissolution. While maintaining this solution at a temperature of 30° C., 6 N nitric acid was added gradually to cause the precipitation of tungstic acid. When this precipitation was completed, the precipitate was washed with water by decantation until the washed water became almost neutral.

Subsequently spheres of alumina having a surface area of about 1 m.$^2$/g. and a diameter of about 3 millimeters were introduced into a rotary drum. While revolving this drum, a paste of tungstic acid made by adding a small amount of water was introduced into this drum little by little. Hot air heated at a temperature of 150° C. was continuously blown into the rotary drum to dry and to adhere the tungstic acid firmly on the surface of alumina spheres. 20 cc. of the thus obtained carriers coated with tungstic acid were packed in the central part of a quartz reaction tube having a diameter of 25 millimeters and a small amount of glass wool was filled at both ends to fix the catalyst. The reaction tube was inserted in a tubular electric furnace and the temperature of the catalyst was controlled at about 450° C.

Then a mixture consisting of 3.7% of dimethyl ether and 96.3% of air was delivered into the above-mentioned reaction tube at a space velocity of 4,000 cc./cc. hr., by which a reacted gas consisting of 5.2% of formaldehyde, 0.2% of carbon dioxide, 0.7% of carbon monoxide, 0.7% of dimethyl ether, 76.7% of nitrogen and 16.5% of oxygen was obtained. This shows that the conversion of dimethyl ether obtained in one passage of the gas mixture over the catalyst is 81%, the selectivity is 86.2%, and the yield of formaldehyde is 70.3%.

EXAMPLE 2

A gaseous mixture consisting of 1.0% of dimethyl ether, 6.0% of methanol, and 93.0% of air was reacted in the same conditions and with the same catalyst as in Example 1, whereby a reacted gas consisting of 7.5% of formaldehyde, 16.5% of oxygen, 75.2% of nitrogen and 0.8% of carbon monoxide was obtained. This shows that the conversion of dimethyl ether and methanol obtained in one passage of the gas mixture over the catalyst is 100%, and the selectivity is 90%. The composition of the starting mixed gas is in a lower concentration than the explosion limit of a mixture of dimethyl ether and methanol. At the temperature of 400° C. the conversion of methanol was 100 percent, the conversion of dimethyl ether was 97 percent and the yield was 88 percent.

EXAMPLE 3

Tungsten oxide powder which was prepared as in Example 1 was shaped into tablets of 5 mm$\phi$. 80 g. of the tablet catalyst was packed in the center of a quartz reactor having a diameter of 25 millimeters.

A mixture of air and dimethyl ether, containing 3% of dimethyl ether, was preheated and passed continuously at a rate of 5,000 cc. gas/cc. cat. hr. over 80 g. of the catalyst maintained at 450° C.

Under these conditions, the conversion of dimethyl ether obtained in one passage of the gas mixture over the catalyst was 100% and the yield of formaldehyde amounts to 77%. These conversions and yields were maintained for a period of 1,000 hrs. without diminution.

EFFLUENT GAS COMPOSITION

|  | Percent |
|---|---|
| Formaldehyde | 4.6 |
| Carbon dioxide | 0.3 |
| Carbon monoxide | 0.9 |
| Nitrogen | 77.4 |
| Oxygen | 16.8 |

EXAMPLE 4

The same catalyst as in Example 1 was used. A mixed gas of 3.0% of dimethyl ether and 97.0% of air was passed through the same reaction tube as in Example 1 at a space velocity of 1,000 cc./cc. hr., which tube was filled with the catalyst and maintained at 350° C. The following gas product was obtained:

|  | Percent |
|---|---|
| Formaldehyde | 2.92 |
| Unreacted dimethyl ether | 1.22 |
| Carbon monoxide | 0.27 |
| Carbon dioxide | 0.09 |
| Nitrogen | 77.0 |
| Oxygen | 18.5 |

This shows that the conversion is 60%, the selectivity is 80%, and the yield is 48%.

EXAMPLE 5

The same catalyst as in Example 1 was used. A gas mixture of 1.0% of dimethyl ether and 99.0% of air was passed at a space velocity of 20,000 cc./cc. hr. through the same reaction tube as in Example 1 filled with the catalyst and kept at 600° C. The resulting reaction gas product was composed of 1.08% of formaldehyde, 0.1% of unreacted dimethyl ether, 1.35% of carbon monoxide, 1.11% of carbon dioxide, 78.2% of nitrogen, and 19.69% of oxygen. This shows that the conversion is 90%, the selectivity is 60%, and the yield is 54%.

EXAMPLE 6

$(NH_4)_2HPO_4$ (1 g.) was dissolved in 60 cc. of water, and 40 g. of tungsten oxide was added thereto and well stirred. Alumina carrier (60 g.) having a low surface area and a diameter of 5/16 in. was charged into a rotary drum, and the tungsten oxide mixture was fed into the drum while rotating. Hot air at 100° C. was blown thereinto to dry gradually the mixture to coat the carrier with the mixture. After the completion of the coating, the coated carrier was well dried in a desiccator at room temperature, thereafter placed in an electric oven, heated with gradually elevating the temperature, and burned at 500° C. for 7 hours, after which it was cooled slowly to room temperature. The thus produced catalyst is very hard as compared with a catalyst from tungsten oxide alone, and greatly resistive to the mechanical erosion of gas. A powdering test of the produced catalyst shows that 3% thereof is powdered for 20 min. as compared with the fact that 24% of a catalyst produced from tungsten oxide alone is powdered in the same test.

Said produced catalyst (40 cc.) was charged into a stainless steel reaction tube having a diameter of 1 in., soaked in a melted salt bath and the catalyst layer was heated at 450° C. A mixture of 3% of dimethyl ether and 97% of air was passed at a space velocity of 1,000 cc./cc. cat. hr. through the catalyst layer to obtain the reaction product composed of 4.4% of formaldehyde, 0.4% of carbon dioxide. 1.2% of carbon monoxide, 0% of dimethyl ether, 74.5% of nitrogen, and 19.5% of oxygen. This shows that the conversion is 100% and the selectivity is 75%.

EXAMPLE 7

Conc. $H_3PO_4$ (purity: 85.4%) (26 cc.) was dissolved in 1,000 cc. of water, and 950 g. of $WO_3$ was added thereto. The resulting mixture was well milled into a paste. This paste was dried at 100° C. for 12 hours and thereafter ground into 12 mesh to obtain a well flowable powder. The thus size-controlled tungsten oxide powder containing 3.6% by weight of phosphoric acid was shaped into tablets of 5 mm$\phi$ x 3.6 mm. These tablets were placed in an electric oven, heated slowly to 500° C., at which they were burned for 8 hours. They were thereafter cooled to room temperature slowly. The thus produced catalyst was very hard as compared with a catalyst from tungsten oxide alone. That is, the compression strength of the former catalyst was 3.5 kg., while that of the latter is 0.38 kg. It follows that the addition of phosphoric acid increases the strength by 9.5 times.

Said produced catalyst was charged into the same reactor as in Example 9 and heated at 450° C., through which a mixed gas of 3% of dimethyl ether and 97% of air was passed at a space velocity of 5,000 cc./cc. hr. to obtain the reaction product consisting of 4.6% of formaldehyde, 0.3% of carbon dioxide, 0.9% of carbon monoxide, 77.4% of nitrogen, and 16.8% of oxygen. This shows that the conversion is 100% and the selectivity is 77%.

EXAMPLE 8

In the same manner as in Example 1, a gas mixture consisting of 12% of dimethyl ether and 88% of air was delivered at 450° C. into the reaction tube at a space velocity of 3,000 cc./cc. hr. to obtain the following result:

|   |   |
|---|---|
|   | Percent |
| Conversion of dimethyl ether | 83.4 |
| Yield of formaldehyde | 62.6 |

EXAMPLE 9

In the same manner as in Example 1, a gas mixture consisting of 15% of dimethyl ether and 85% of air was delivered at 460° C. into the reaction tube at a space velocity of 2,000 cc./cc. hr. to obtain the following result:

|   |   |
|---|---|
|   | Percent |
| Conversion of dimethyl ether | 77.7 |
| Yield of formaldehyde | 56.9 |

EXAMPLE 10

The catalyst same as that in Example 1 was packed in a multi-tubular heat exchange type reactor, the said multitube having a diameter of 30 millimeters. The reaction temperature was controlled by circulating a molten salt.

A total gas mixture of 27 m.³/hr. consisting of 7.5% of dimethyl ether and 92.5% of air was reacted at maximum temperature of 500° C. at a space velocity of 2,500 m.³/m.³ hr. to obtain the following result:

|   |   |
|---|---|
|   | Percent |
| Conversion of dimethyl ether | 94.8 |
| Yield of formaldehyde | 76.4 |

The above reaction could be carried out in an extremely stable operation.

EXAMPLE 11

In the same manner as in Example 10, a gas mixture consisting of 5.0% of dimethyl ether, 4.0% of methanol and 91.0% of air was reacted to obtain the following result wherein the conversion is calculated by assuming the exit dimethyl ether to be unreacted:

|   |   |
|---|---|
|   | Percent |
| Overall conversion | 90.2 |
| Yield of formaldehyde | 81.3 |

EXAMPLE 12

In the same manner as in Example 1, a gas mixture consisting of 2.0% of dimethyl ether, 20.0% of methanol and 78% of air was delivered at 500° C. in the reaction tube at a space velocity of 2,500 cc./cc. hr. to obtain the following result:

|   |   |
|---|---|
|   | Percent |
| Overall conversion | 83.4 |
| Yield of formaldehyde | 74.5 |

What is claimed is:

1. A process for producing formaldehyde which comprises forming a mixture of 1 to 3.4% of dimethyl ether and 99 to 96.6% of air and contacting the said gaseous mixture with a catalyst consisting essentially of tungsten oxide at a temperature of from 350° to 600° C. and at a space velocity of from 1000 to 20,000.

2. A process according to claim 1, wherein the amount of dimethyl ether is 3 to 3.4%.

3. A process according to claim 1, wherein the temperature is 400° to 500° C.

4. A process according to claim 1, wherein the space velocity is 4,000 to 7,000.

5. A process according to claim 1, wherein the amount of dimethyl ether is 3 to 3.4%, and the temperature is 400° to 500° C.

6. A process according to claim 1 wherein the amount of dimethyl ether is 3 to 3.4%, and the space velocity is 4,000 to 7,000.

7. A process according to claim 1, wherein the temperature is 400° to 500° C., and the space velocity is 4,000 to 7,000.

8. A process according to claim 1, wherein the amount of dimethyl ether is 3 to 3.4%, the temperature is 400° to 500° C., and the space velocity is 4,000 to 7,000.

9. A process for producing formaldehyde which comprises forming a mixture of 1 to 3.4% of dimethyl ether, 1 to 6% of methanol and 93 to 98% of air and contacting the gaseous mixture with a catalyst consisting essentially of tungsten oxide at a temperature of from 350° to 600° C. and a space velocity of 4,000 to 10,000.

10. A process for producing formaldehyde which comprises forming a mixture of 1 to 3.4% of dimethyl ether and 99 to 96.6% of air and contacting the gaseous mixture at a temperature of 350° C. to 600° C. and a space velocity of 1,000 to 20,000 with a catalyst consisting essentially of tungsten oxide and not more than 10% by weight of an additive selected from the group consisting of oxides of boron, phosphorous, vanadium, selenium, molybdenum and bismuth, phosphoric acid, ammonium phosphate and ammonium chloride.

11. A process according to claim 9, wherein the mixture contains 1% of dimethyl ether, 6% of methanol and 93% of air.

12. A process according to claim 9 wherein the temperature is from 400° C. to 500° C.

13. A process according to claim 9 wherein the space velocity is 4,000 to 10,000.

14. A process for producing formaldehyde which comprises forming a mixture of 1 to 3.4% of dimethyl ether and 99 to 96.6% of air and contacting the said gaseous mixture at a temperature of from 350° to 600° C. and at a space velocity of 1000 to 20,000 with a catalyst consisting essentially of tungsten oxide and not more than 10% by weight of an additive selected from the group consisting of oxides of boron, phosphorus, vanadium, selenium, molybdenum and bismuth, phosphoric acid, ammonium phosphate and ammonium chloride.

References Cited

UNITED STATES PATENTS 2,467,223   4/1949   Payne _____ 260—606

FOREIGN PATENTS 4,023,645   10/1965   Japan _____ 260—603 HF
1,065,251   4/1967   Great Britain ____ 260—603 HF
589,292     6/1947   Great Britain _____ 260—606
157,399     7/1943   Japan _____ 260—606
168,291     3/1906   Germany _____ 260—604 R

OTHER REFERENCES

Sabatier et al., Ann. de Chim. et de Phys., vol. 20, pp. 289–291, 301–302, 319–321, and 327–329.

LEON ZITVER, Primary Examiner

R. H. LILES, Assistant Examiner

U.S. Cl. X.R.

260—606

UNITED STATES PATENT OFFICE
CERTIFICATE OF CORRECTION

Patent No. 3,655,771　　　　　　　　　Dated April 11, 1972

Inventor(s) HACHIRO TADENUMA, ET AL.

It is certified that error appears in the above-identified patent and that said Letters Patent are hereby corrected as shown below:

In line 9 of the heading to the patent insert following "Ser. No. 776,293"

-- Priority claimed of Application in Japan No. 34,365/63, filed July 4, 1963. --

Signed and sealed this 30th day of January 1973.

(SEAL)
Attest:

EDWARD M. FLETCHER, JR.
Attesting Officer

ROBERT GOTTSCHALK
Commissioner of Patents